Nov. 11, 1947.                P. VAN SITTERT ET AL                2,430,839
                                  FASTENER
                             Filed Oct. 14, 1943

INVENTORS
PAUL VAN SITTERT
WILLIAM R. KOVACS
BY
ATTORNEY

Patented Nov. 11, 1947

2,430,839

UNITED STATES PATENT OFFICE 2,430,839

FASTENER

Paul Van Sittert, Shaker Heights, and William R. Kovacs, Cleveland, Ohio, assignors to The Cleveland Pneumatic Tool Company, Cleveland, Ohio, a corporation of Ohio Application October 14, 1943, Serial No. 506,154

2 Claims. (Cl. 85—5)

The present invention relates to fasteners for temporarily holding together perforated plates or sheets in superposed relation preparatory to riveting or the like.

Temporary fasteners of the herein described type have become generally known in the trade as sheet holders and are usually applied to and removed from the plates or sheets by means of specially designed pliers, one form of which is illustrated in U. S. Patent No. 2,301,833, dated November 10, 1942. These sheet holders are being widely used in the aircraft industry with a great deal of success. However, in the prior art devices, there is a tendency for certain of the parts to become broken, causing the fasteners to spring out of the sheets or pliers and thereby presenting a serious hazard to workers.

It is, therefore, an object of the present invention to provide a temporary fastener, the parts of which are united in a manner to substantially preclude the possibility of injury to workers should the fastener break while in use.

Other objects and advantages more or less ancillary to the foregoing reside in the specific construction and aggroupment of the elements peculiar to this structure, as will become apparent from a more complete examination of this specification.

In the drawing which illustrates the invention:

Figure 1:
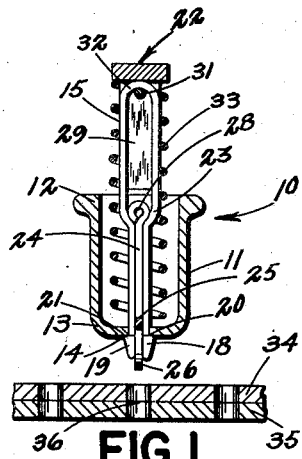
Fig. 1 is a vertical sectional view of the improved fastener about to be inserted in the sheets.

Referring to the drawing for a more detailed description thereof, and particularly to the preferred form of the invention as illustrated in Figs. 1 to 4, inclusive, a temporary fastener or sheet holder embodying the features of the present invention is generally designated by the reference numeral 10 and is shown to comprise a substantially cylindrical shaped housing 11 formed at its upper end with an external annular flange 12, and having its lower end formed by a cross wall or base 13 having a cylindrical central bore 14 formed therein and extending therethrough.

Figure 2:
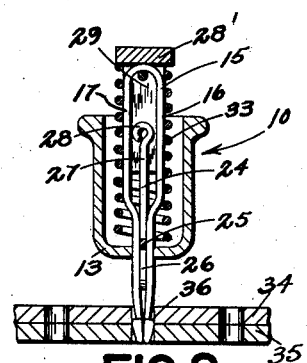
Fig. 2 is a view similar to Fig. 1 illustrating the position assumed by the fastener as it is inserted in aligned holes in the sheets.

Slidably mounted within the housing 11 and capable of movement through the bore 14 is a retainer 15, said retainer being in the shape of a hairpin and comprising leg portions 16 and 17, the free ends of which are formed with enlarged pointed heads 18 and 19, respectively, and forming an outwardly inclined lateral projection 20 and 21 engageable with the underside of the sheets to be clamped, as will be hereinafter more fully explained. As more particularly shown in Figs. 1 and 2 of the drawing, the leg portions 16 and 17 depend from the head 22 in substantially parallel relation for a portion of their length and are then bent inwardly as indicated at 23 from which position they extend downwardly in substantially parallel relation through the central bore 14. The retainer 15 is preferably formed of a resilient material having a characteristic which would normally cause the ends 18 and 19 to flex toward each other, as illustrated in Fig. 2. However, in order to maintain said leg portions in substantially parallel relation, there is provided a spreader 24 having a T-portion 25 normally resting on the bottom wall 13 of the housing 11. A tail piece 26 extends downwardly from the T-portion 25 and is normally positioned between the ends 18 and 19 as shown in Fig. 1. Extending upwardly from the T-portion 25 is a member 27, the upper end of which is formed with a hook-like portion 28 adapted, when the parts are in the neutral position shown in Fig. 1 of the drawing, to be confined within the bent area 23 of the retainer 15. As is to be understood, the member 27, T-portion 25, and tail piece 26 are of integral construction, said spreader in elevation being in the form of a cross.

Figure 4:
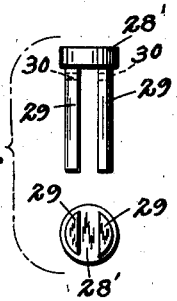
Fig. 4 is a side elevation and bottom plan view of the head of the fastener.

The head 22 is shown detached from the fastener in Fig. 4 of the drawing and comprises a disk 28 from which depends a pair of spaced arms 29, said arms being of a width substantially equal to the width of the leg portions 16 and 17 so as to confine said portions therebetween when the device is assembled. A pair of aligned openings 30 extend transversely through the arms 29 adjacent the disk 28' through which extends a pin 31 around which the U-portion 32 of the retainer 15 is positioned. Thus the retainer 15 is secured to the head 22 and the spreader 24 is secured to the retainer 15 to form a compact unit.

Interposed between the upper face of the T portion 25 and the lower face 25 of the disk 28' is a compression spring 33 for constantly urging the head 22 and retainer 15 upwardly. The lower end of the spring resting upon the T-portion 25 will retain the spreader in a fixed position relative to the cylinder 11 at all times.

As it is to be understood, the fastener 10 is designed to hold a pair of sheets 34 and 35 in perfect perforate alignment, the enlarged ends 18 and 19 being inserted through aligned rivet holes 36 provided through the sheets 34 and 35. The fastener 10 is ordinarily applied to and removed from the sheets by means of specially designed pliers, one jaw of the pliers being in engagement with the head 22 and the other jaw positioned beneath the annular flange 12 while partially encircling the cylinder 11. Upon moving the jaws of the pliers toward each other, the retainer 15 is projected beyond the bottom wall 13 carrying with it the head 28', and since the ends 18 and 19 are moved beyond the tail piece 26, said ends will flex inwardly as they are inserted through the rivet holes 36 as illustrated in Fig. 2. This movement of the retainer 15 will, of course, compress the spring 33 and as soon as the ends 18 and 19 have passed through the sheets, pressure on the pliers is released permitting the spring 33 to urge the head 22 and unit 15 upwardly. With the cylinder 11 resting upon the upper face of the sheet, the spring 33 will securely clamp the sheets between the lateral projecting portion 20 and the base 13 of the cylinder. It is, of course, to be understood that in this position the spreader tail piece 26 has also been moved through the rivet holes 36 so as to urge the enlarged ends 18 and 19 outwardly for clamping engagement, and the combined diameter of the leg portions 15 and 16 and the tail piece 26 is equal to or slightly greater than the diameter of the holes 36.

Figure 3:
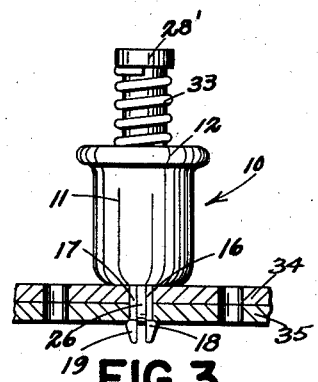
Fig. 3 is a front elevational view of the fastener applied to the sheets.

In prior art devices these fasteners have a tendency to break due to constant use, faulty materials, or other reasons. This breakage usually occurs on the enlarged ends of the leg portions or the spreader. With the fastener applied to the sheets as illustrated in Fig. 3, such breakage of the enlarged heads or spreader would release the several parts of the device, permitting the compression spring to extend to its limit with the result that the parts would fly upwardly and outwardly, presenting a serious hazard to the workman. When the device is in the sheet gripping position of Fig. 3 the hook 28 will stand about half way between its positions in Figs. 1 and 2. Under that condition if the ends 18, 19 should break off or if the shoulders 20 and 21 should wear and finally shear off, the spring 33 would immediately expand, but instead of being permitted to expand fully it would be checked in the condition illustrated in Fig. 1. The whole device including the housing 11 might then jump away from the work a short distance. Under the conditions mentioned the retainer and its head 22 cannot be discharged out of the housing 11 because the spring 33 holds the leg portions 16 and 17 from spreading apart and consequently the inward bends 23 positively engage the hook 28. The spring of course acts downwardly on the T-portion 25 of the spreader at the same time that it acts upwardly against the head 22. Hence, when the parts reach the positions of Fig. 1 further expansion of the spring is impossible. Because of this reduced spring expansion the impetus given the retainer by the sudden release of the spring is greatly reduced and the possibility of injury to an operator is minimized.

Figure 7:
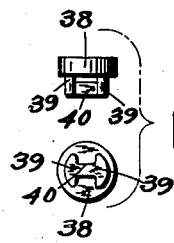
Fig. 7 is a side elevation and bottom plan view of the head of the modified fastener.
Figure 5:
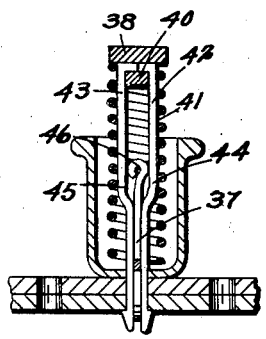
Fig. 5 is a vertical sectional view of a modified form of the invention.
Figure 6:
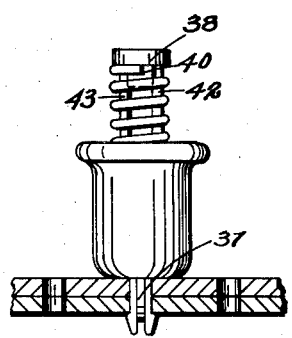
Fig. 6 is a front elevational view thereof.

In Figs. 5, 6, and 7 of the drawing, there is shown a modified form of the invention, and it will be noted that the spreader 37 is identical with the spreader 24 of the preferred form. The head of the fastener is particularly shown in Fig. 7 and comprises a disk-like member 38 from which depends relatively short arms 39 united by a cross member 40. The retaining unit 41 is formed of two members 42 and 43, the upper ends of which project laterally inwardly over the cross member 40. As in the preferred form, legs 42 and 43 curve inwardly as indicated at 44 providing a restricted area 45 which confines the hooked end 46 of the spreader 37. This form of the invention may occasionally be desired over the preferred form due to its simplicity in assembling. The use and operation of this form of the invention is substantially the same as in the preferred form, and it will be readily understood that the several parts are united in a manner to substantially preclude the possibility of injury to workers should the stem or spreader break while in use.

Although the foregoing description is necessarily of a detailed character, in order to completely set forth the invention, it is to be understood that the specific terminology is not intended to be restrictive or confining, and it is to be further understood that various rearrangements of parts and modifications of structural detail may be resorted to without departing from the scope or spirit of the invention as herein claimed.

We claim:

1. A device for temporarily clamping together perforated sheets in superposed relation comprising a housing having a sheet engaging base provided with an opening, a head piece movable relative to said housing, said head piece including a pair of spaced downwardly extending arms, a retainer carried by said head piece having leg portions disposed within said downwardly extending arms, the lower ends of said leg portions being operable toward each other and provided with lateral projections, a spreader resting against the inside of said base having a portion interposed between said legs, spring means having one end engaging said head piece and its other end maintaining said spreader in bearing engagement with said base, said spring means drawing said retainer inwardly of said body to urge said lateral projections spaced by said spreader against the underside of the sheets being clamped, and means for uniting said spreader with the legs of said retainer to preclude separation of said spreader and retainer upon accidental detachment of said device from the sheets.

2. In a device of the character described, a cup-shaped housing having an opening in its base, a retainer slidable through said opening, said retainer having a head at its end remote from the base and having resilient legs, a spreader disposed between said legs, the lower ends of said legs being closely spaced and slidable upon said spreader, the upper ends of the legs being widely spaced, said spreader having a transverse portion within the housing engaging the base thereof on both sides of said legs, and a coil spring closely surrounding the widely spaced portions of the legs, engaging said head and said transverse portion, said spreader having an enlargement at its upper end contained entirely within and bridging the space between the widely spaced portions of the legs, said enlargement acting as a stop to limit the relative movement of the retainer and spreader responsive to spring action.

PAUL VAN SITTERT.
WILLIAM R. KOVACS.

REFERENCES CITED

The following references are of record in the file of this patent:

UNITED STATES PATENTS

| Number | Name | Date |
|---|---|---|
| 2,339,881 | Rossman | Jan. 25, 1944 |
| 2,343,499 | Edwards | Mar. 7, 1944 |
| 2,346,431 | Head | Apr. 11, 1944 |